UNITED STATES PATENT OFFICE.

WILLIAM L. VOELKER, OF ELIZABETH, NEW JERSEY, ASSIGNOR TO THE VOELKER LIGHT COMPANY, OF NEW JERSEY.

PROCESS OF MANUFACTURING INCANDESCIBLE MATERIAL.

SPECIFICATION forming part of Letters Patent No. 595,839, dated December 21, 1897.

Application filed May 1, 1897. Serial No. 634,772. (No specimens.)

*To all whom it may concern:*

Be it known that I, WILLIAM L. VOELKER, a citizen of the United States, and a resident of Elizabeth, county of Union, State of New Jersey, have invented certain new and useful Improvements in Processes of Manufacturing Incandescible Materials, of which the following is a specification.

This invention relates to improvements in processes for manufacturing incandescible materials for use in making mantles or hoods for incandescent gas-lights.

The invention especially relates to a process for producing a very intimate union, in such an incandescible material, of the oxids of magnesium and calcium. I have found that a material produced by the union of the oxids of magnesium and calcium has a high incandescent power and great durability. In general terms the union of these oxids has been described in Letters Patent of the United States numbered 568,184, dated September 22, 1896, and the present invention relates to an improved process for the manufacture of such a material.

I have found that no mere mechanical method, such as grinding the oxids, will produce a sufficiently intimate union, even with the addition of fusion after the grinding and without the aid of chemical reagents. My present process resorts to the action of chemical reagents as one step, whereby I find the molecules of the oxids of the two minerals are finally brought together in a most intimate arrangement and union.

Essentially the process consists in treating the oxids of calcium and magnesium, together with any suitable acid which will produce magnesium and calcium salts that can be afterward decomposed back to the oxids, and then reducing such salts to the oxids. The oxids are then heated together by intense heat, as the electric arc, in a suitable furnace, the result being a most intimate and durable combination of the two oxids. I find that nitric, hydrochloric, or sulfuric acid may be used to produce the salts, and I prefer nitric acid, although I do not limit the process to the use of any particular acid.

Assuming nitric acid is to be used, the process is operated as follows: I first take equal parts, by weight, of the oxids of calcium and magnesium and reduce them to the finest practicable powder by grinding in porcelain mills or mortars. The lumps of the oxids may be put in the mill and ground together or they may be ground separately and then intimately mixed and reground, the object being to produce the most thorough intermixture of the powdered oxids practicable. The powdered and mixed oxids are next dissolved in nitric acid, to which a trace of chromic acid may be added if it is desired to give a ruddy tinge to the light, and the solution is then evaporated by heat to the point of decomposition. At this stage of the process the oxids are converted into nitrates, and I find by experience that during this solution and decomposition the minerals are brought into a very intimate union. The evaporation is continued until the solution is reduced to a wax-like consistency. The mass is then transferred to a magnesium or calcium crucible, heated to a bright red heat, and kept at this temperature for some time. For small amounts of material the heating should be continued for about one hour for every pound of the material. Thus for five pounds of material the heating should be continued for between four and five hours. For larger amounts of material the heating can be proportionally somewhat shortened. During this step the nitrates are decomposed and reconverted into oxids of magnesium and calcium, and during this step, again, the intimate union of the oxids is promoted. Upon the completion of the decomposition the mass, consisting of the combined oxids of magnesium and calcium, is transferred to a crucible and heated to the point of fusion in a suitable furnace, such as an electrical furnace. It is preferably kept in a molten condition for some little time to facilitate the still further intimate union of the oxids. The molten mass is then allowed to cool, forming a cake, which can be ground up and treated in the manner described in United States Letters Patent No. 568,184, dated September 22, 1896, to form a mass from which filaments can be made, or the molten material can be run into molds and cast into sticks, from which filaments can be drawn in the manner described in an application for Letters Patent filed May 19, 1896, Serial No. 592,114, and these filaments can be spun together to form a thread, which can then be knit into hoods or mantles.

Now, having described my improvements, I claim as my invention—

The process hereinbefore described for manufacturing incandescible materials, consisting in reducing the oxids of magnesium and calcium to salts together, then decomposing the salts and reconverting them into the oxids, then fusing the resultant mass and finally cooling to a solid state.

In testimony that I claim the foregoing as my invention I have signed my name, in presence of two witnesses, this 29th day of April, 1897.

WILLIAM L. VOELKER.

Witnesses:
BERNARD J. ISECKE,
HENRY V. BROWN.